US012381323B2

(12) United States Patent
Wu et al.

(10) Patent No.: US 12,381,323 B2
(45) Date of Patent: Aug. 5, 2025

(54) DUAL-BAND ANTENNA, ANTENNA ARRAY AND ELECTRONIC DEVICE

(71) Applicants: Beijing BOE Technology Development Co., Ltd., Beijing (CN); BOE Technology Group Co., Ltd., Beijing (CN)

(72) Inventors: Qianhong Wu, Beijing (CN); Jingwen Guo, Beijing (CN); Chunxin Li, Beijing (CN); Jianxing Liu, Beijing (CN); Jianyun Zhao, Beijing (CN); Zibo Cao, Beijing (CN); Feng Qu, Beijing (CN); Biqi Li, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/278,836

(22) PCT Filed: Oct. 31, 2022

(86) PCT No.: PCT/CN2022/128649

§ 371 (c)(1),
(2) Date: Aug. 24, 2023

(87) PCT Pub. No.: WO2024/092412

PCT Pub. Date: May 10, 2024

(65) Prior Publication Data

US 2025/0023240 A1 Jan. 16, 2025

(51) Int. Cl.
*H01Q 5/364* (2015.01)
*H01Q 9/04* (2006.01)
*H01Q 21/24* (2006.01)

(52) U.S. Cl.
CPC ............ *H01Q 5/364* (2015.01); *H01Q 9/045* (2013.01); *H01Q 21/245* (2013.01)

(58) Field of Classification Search
CPC ........ H01Q 5/357; H01Q 5/342; H01Q 5/307; H01Q 5/364; H01Q 9/0407; H01Q 9/045; H01Q 21/24; H01Q 21/245
See application file for complete search history.

(56) References Cited

U.S. PATENT DOCUMENTS

| | | | | |
|---|---|---|---|---|
| 5,969,681 | A | 10/1999 | O'Neill, Jr. | |
| 2016/0079676 | A1 | 3/2016 | Chuang et al. | |
| 2021/0336348 | A1* | 10/2021 | Sudo .................... | H01Q 21/065 |

FOREIGN PATENT DOCUMENTS

| | | | | |
|---|---|---|---|---|
| CA | 2561848 A1 * | 4/2007 | ............... | H01Q 5/35 |
| CN | 1304565 A | 7/2001 | | |

(Continued)

*Primary Examiner* — Daniel Munoz
(74) *Attorney, Agent, or Firm* — Ling Wu; Stephen Yang; Ling and Yang Intellectual Property

(57) ABSTRACT

A dual-band antenna of the present disclosure includes: a dielectric substrate having a first surface and a second surface disposed opposite each other in a thickness direction of the dielectric substrate; a reference electrode disposed on the first surface; all of the radiating element, the first feed branch and the second feed branch are disposed on the second surface, and a connection node of the first feed branch and the radiating element is a first feed point, and the connection node of the second feed branch and the radiating element is a second feed point; the radiating element is provided with a first groove and a second groove.

20 Claims, 15 Drawing Sheets

(56) References Cited

FOREIGN PATENT DOCUMENTS

| | | | |
|---|---|---|---|
| CN | 105356055 | A | 2/2016 |
| CN | 112054289 | A | 12/2020 |
| CN | 113506982 | A | 10/2021 |
| JP | 06112724 | A | 4/1994 |

* cited by examiner

DUAL-BAND ANTENNA, ANTENNA ARRAY AND ELECTRONIC DEVICE

CROSS-REFERENCE TO RELATED APPLICATION

This application is a national stage application of PCT Application No. PCT/CN2022/128649, which is filed on Oct. 31, 2022 and entitled "Dual-band Antenna, Antenna Array and Electronic Device", the content of which should be regarded as being incorporated herein by reference.

TECHNICAL FIELD

The present invention belongs to the technical field of communication, in particular to a dual-band antenna, an antenna array and an electronic device.

BACKGROUND

In order to meet an increasing demand of mobile communication, Sub 6G and millimeter wave bands have been added for 5G communication, wherein the millimeter wave bands include n257 band (26.5-29.5 GHz), n258 band (24.25-27.5 GHz), n260 band (37-40 GHz) and n261 band (27.5-28.35 GHz), and the first three are also referred to as 26 GHz, 28 GHz and 39 GHz.

In view of a large span between the millimeter wave bands, dual-band/multi-band antennas are respectively usually used to meet requirements for multi-band communication, which can be achieved by producing a plurality of resonances by a single radiating element or by producing respective resonances respectively by a plurality of radiating elements. The dual-band/multi-band antennas produced by these two methods generally have narrow bandwidth and the latter has larger dimensions of an antenna. Considering a practical application of the millimeter wave antenna and an antenna array, it is usually required to develop a smaller and lighter antenna. Therefore, it is necessary to develop a small millimeter wave antenna with a low profile, covering a plurality of frequency bands as much as possible, wherein a wider bandwidth of each frequency band is better, or the frequency bands are adjustable.

SUMMARY

The present invention aims at solving at least one of the technical problems existing in the prior art, and provides a dual-band antenna, an antenna array and an electronic device.

In a first aspect, a dual-band antenna is provided in an embodiment of the present disclosure, which includes:

- a dielectric substrate having a first surface and a second surface disposed opposite each other in a thickness direction of the dielectric substrate;
- a reference electrode disposed on the first surface;
- a radiating element, a first feed branch and a second feed branch, wherein the radiating element, the first feed branch and the second feed branch are all disposed on the second surface, and a connection node of the first feed branch and the radiating element is a first feed point, and a connection node of the second feed branch and the radiating element is a second feed point; all of the radiating element, the first feed branch and the second feed branch are overlapped, at least partially, with an orthographic projection of the reference electrode on the first surface.

The radiating element is provided with a first groove and a second groove, wherein the first groove has a first length and the second groove has a second length; the first length and the second length are not equal; length values of the first length and the second length, as well as positions of the first feed point and the second feed point lead to different frequencies of microwave signals radiated by the first feed branch and the second feed branch through the radiating element.

The reference electrode is provided with a third groove that is overlapped, at least partially, with the orthographic projection of the radiating element on the dielectric substrate.

A center of a profile of an orthographic projection of the radiating element on the dielectric substrate is coincident with a center of an orthographic projection of the third groove on the dielectric substrate.

The radiating element is provided with a fourth groove, a center of an orthographic projection of the fourth groove on the dielectric substrate coincides with a center of a profile of an orthographic projection of the radiating element on the dielectric substrate.

The radiating element is provided with a fourth groove, the fourth groove is an annular groove, and a center of an orthographic projection of the annular groove on the dielectric substrate coincides with a center of a profile of an orthographic projection of the radiating element on the dielectric substrate.

The dual-band antenna further includes a feeding structure including a first microstrip line, a second microstrip line, a first impedance transformation assembly and a second impedance transformation assembly; wherein the first microstrip line is electrically connected with the first feed branch through the first impedance transformation assembly, and the second microstrip line is electrically connected with the second feed branch through the second impedance transformation assembly.

The feeding structure further includes a first connector and a second connector, wherein the first connector is electrically connected with the first microstrip line, and the second connector is connected with the second microstrip line.

The dual-band antenna further includes a feeding structure including a first microstrip line and a switching unit, wherein the feeding structure is electrically connected with the first feed branch and the second feed branch through the switching unit, and the switching unit is configured to perform time division gating a connection of the first microstrip line with the first feed branch through the switching unit and a connection of the first microstrip line with the second feed branch.

The switching unit includes a first switching module and a second switching module; wherein the first microstrip line is connected with the first feed branch through the first switching module, and the first microstrip line is connected with the second feed branch through the second switching module.

The first switching module and the second switching module include a PIN diode or a Micro-Electro-Mechanical System, MEMS, switching device.

The feeding structure further includes a first connector connected with the first microstrip line.

The radiating assembly includes an intermediate region and a margin region surrounding the intermediate region, wherein both of the first groove and the second groove are located in the margin region.

The first groove and the second groove are disposed sequentially surrounding the intermediate region.

In a second aspect, an antenna array is provided in an embodiment of the present disclosure, which includes a plurality of dual-band antennas, a first feed network and a second feed network; wherein, the dual-band antenna includes:

a dielectric substrate having a first surface and a second surface disposed opposite each other in a thickness direction of the dielectric substrate;

a reference electrode disposed on the first surface;

a radiating element, a first feed branch and a second feed branch, wherein the radiating element, the first feed branch and the second feed branch are all disposed on the second surface, and a connection node of the first feed branch and the radiating element is a first feed point, and a connection node of the second feed branch and the radiating element is a second feed point; all of the radiating element, the first feed branch and the second feed branch are overlapped, at least partially, with an orthographic projection of the reference electrode on the first surface.

The radiating element is provided with a first groove and a second groove, wherein the first groove has a first length and the second groove has a second length; the first length and the second length are not equal; length values of the first length and the second length, as well as positions of the first feed point and the second feed point lead to different frequencies of microwave signals radiated by the first feed branch and the second feed branch through the radiating element.

The first feed network is configured to feed a first feed branch of each of the dual-band antennas.

The second feed network is configured to feed a second feed branch of each of the dual-band antennas.

The reference electrode is provided with a third groove that is overlapped, at least partially, with the orthographic projection of the radiating element on the dielectric substrate.

A center of a profile of an orthographic projection of the radiating element on the dielectric substrate is coincident with a center of an orthographic projection of the third groove on the dielectric substrate.

The radiating element is provided with a fourth groove, a center of an orthographic projection of the fourth groove on the dielectric substrate coincides with a center of a profile of an orthographic projection of the radiating element on the dielectric substrate.

The radiating element is provided with a fourth groove, the fourth groove is an annular groove, and a center of an orthographic projection of the annular groove on the dielectric substrate coincides with a center of a profile of an orthographic projection of the radiating element on the dielectric substrate.

In a third aspect, an antenna array is provided in an embodiment of the present disclosure. The antenna array includes a plurality of dual-band antennas, wherein the dual-band antennas include any of the dual-band antennas described above.

In a fourth aspect, an electronic device is provided in an embodiment of the present disclosure. The electronic device includes any of the above-mentioned dual-band antennas; or the electronic device includes any of the above-mentioned array antennas.

DETAILED DESCRIPTION

To enable those skilled in the art to better understand the technical solutions of the present invention, a further detailed description of the present invention is given below in conjunction with the accompanying drawings and detailed description.

Unless otherwise defined, technical terms or scientific terms used in the present disclosure should have the meanings as commonly understood by those of ordinary skill in the art that the present disclosure belongs to. The “first”, “second” and similar terms used in the present disclosure do not indicate any order, quantity, or importance, but are used only for distinguishing different components. Similarly, similar words such as “a”, “an” or “the” do not denote a limitation on quantity, but rather denote the presence of at least one. “Include”, “contain”, or similar words mean that elements or objects appearing before the words cover elements or objects listed after the words and their equivalents, but do not exclude other elements or objects. “Connect”, “join”, or a similar term is not limited to a physical or mechanical connection, but may include an electrical connection, whether direct or indirect. “Upper”, “lower”, “left”, “right”, etc., are used to represent relative position relations, and when an absolute position of a described object is changed, the relative position relation may also be correspondingly changed.

Figure 1:
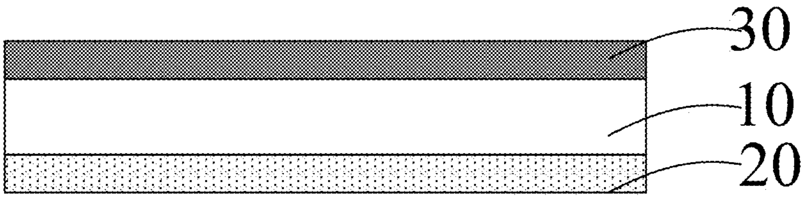
FIG. 1 is a cross-sectional view of a dual-band antenna according to an embodiment of the present disclosure.
Figure 2:
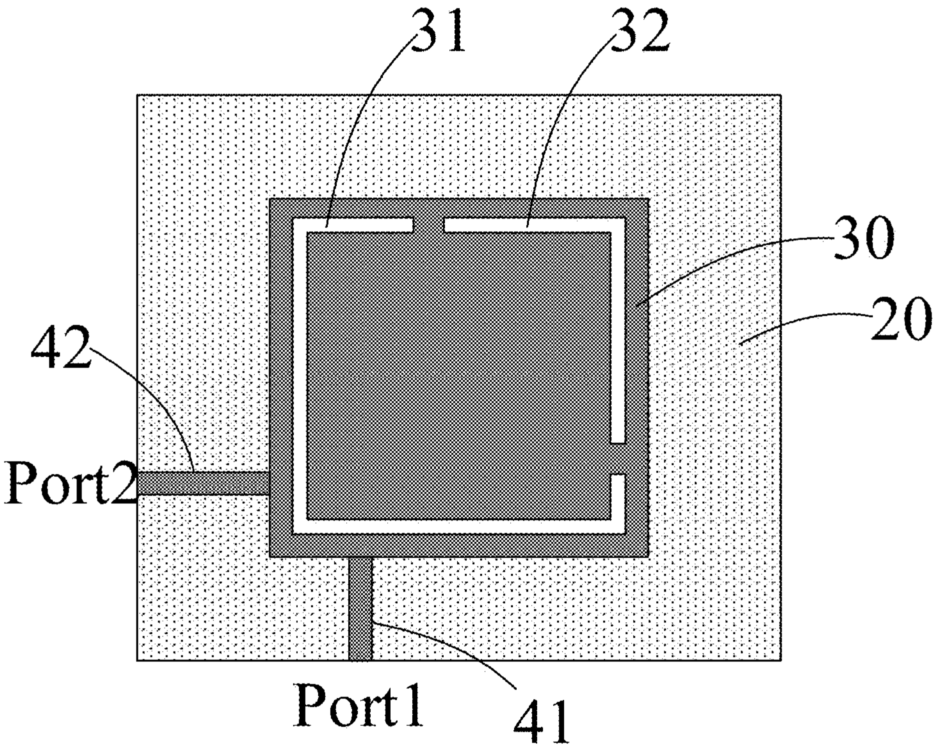
FIG. 2 is a top view of a dual-band antenna according to an embodiment of the present disclosure.

In a first aspect, FIG. 1 is a cross-sectional view of a dual-band antenna according to an embodiment of the present disclosure, and FIG. 2 is a top view of a dual-band antenna according to an embodiment of the present disclosure. As shown in FIGS. 1 and 2, a dual-band antenna is provided in an embodiment of the present disclosure. The dual-band antenna includes a dielectric substrate 10, a reference electrode 20, a radiating element 30, a first feed branch 41 and a second feed branch 42. Herein, the dielectric substrate 10 includes a first surface and a second surface disposed opposite each other in a thickness direction of the dielectric substrate 10. The reference electrode 20 is disposed on the first surface, the radiating element 30, the first feed branch 41 and the second feed branch 42 are disposed on the second surface of the dielectric substrate 10, and each of the radiating element 30, the first feed branch 41 and the second feed branch 42 overlaps at least partially an orthographic projection of the reference electrode 20 on the first surface. The first feed branch 41 is connected with the radiating element 30, and a connection node is a first feed point. The second feed branch 42 is connected with the radiating element 30, and a connection node is a second feed point. The radiating element 30 has a first groove 31 and a second groove 32, and the first groove 31 and the second groove 32 penetrate through the radiating element 30. The first groove 31 has a first length and the second groove 32 has a second length; The first length and the second length are not equal. Length values of the first length and the second length, as well as positions of the first feed point and the second feed point lead to different frequencies of microwave signals radiated by the first feed branch 41 and the second feed branch 42 through the radiating element 30.

The first feed branch 41 and the second feed branch 42 correspond to feed ports, Port1 and Port2, respectively.

In the embodiment of the present disclosure, by designing the lengths of the first groove 31 and the second groove 32 in the radiating element 30 and the positions of the first feed branch 41 and the second feed branch 42 connected with the radiating element 30, a radiation frequency of the microwave signal fed via the first feed branch 41, which is different from a radiation frequency of the microwave signal fed via the second feed branch 42, can be achieved. At that time, different dual-band performances can be achieved by exciting the first feed branch 41 corresponding to the Port1 and the second feed branch 42 corresponding to the Port2 so as to meet a requirement for different operating frequency bands. Moreover, the dual-band antenna according to the embodiment of the present disclosure broadens an impedance bandwidth of an original feed branch without increasing a quantity of the radiating elements 30 and the dimension of the antenna compared with an antenna fed by a single feed branch.

It should be noted that, in an embodiment of the present disclosure, each of the first groove 31 and the second groove 32 has a structure in which the length is much larger than the width. In an embodiment of the present disclosure, the widths of the first groove 31 and the second groove 32 are equal, and the length of the first groove 31 is larger than the length of the second groove 32, that is, the first length is larger than the second length. The first groove 31 having a larger length is used to adjust a low frequency point, and the second groove 32 having a shorter length is used to adjust a high frequency point. The reference electrode includes, but is not limited to, a ground electrode.

In some examples the radiating element 30 may be of any shape such as a square, a circle, a hexagon or the like. In an embodiment of the present disclosure, the radiating element 30 is square as an example. Further, the radiating element 30 includes an intermediate region and a margin region surrounding the intermediate region. The first groove 31 and the second groove 32 are located in the margin region of the radiating element 30. The locations of the first groove 31 and the second groove 32 in the margin region are helpful for the design of the first groove 31 and the second groove 32 and the lengths of the first groove 31 and the second groove 32, due to a circumference of the margin region is longer than a circumference of the intermediate region. Further, the first groove 31 and the second groove 32 are arranged sequentially surrounding the intermediate region. That is, the first groove 31 and the second groove 32 are arranged in a circumferential direction of the intermediate region. For example, each of the first groove 31 and the second groove 32 is a groove including a right angle, as shown in FIG. 2.

Figure 3:
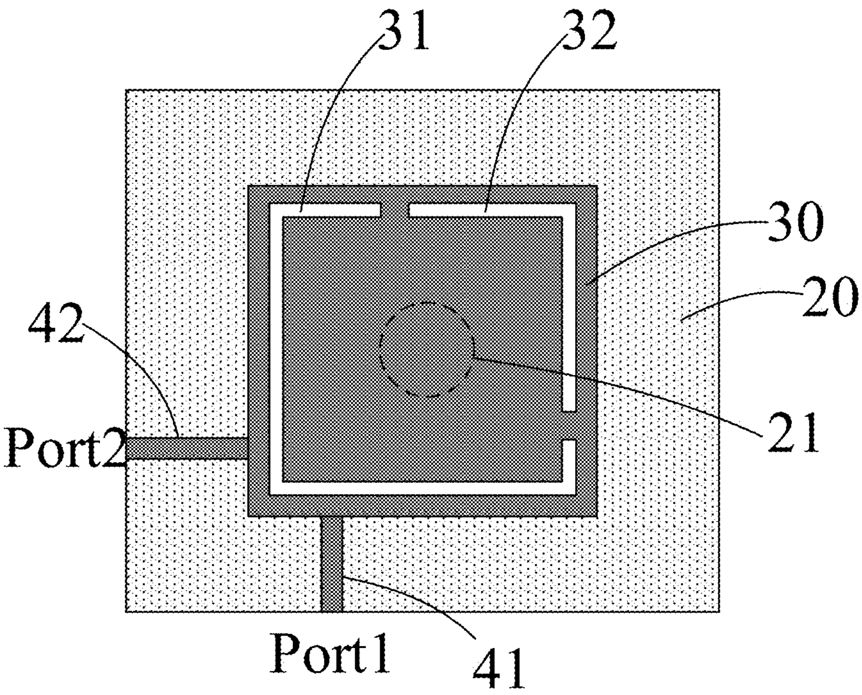
FIG. 3 is a top view of another dual-band antenna according to an embodiment of the present disclosure.
Figure 4:
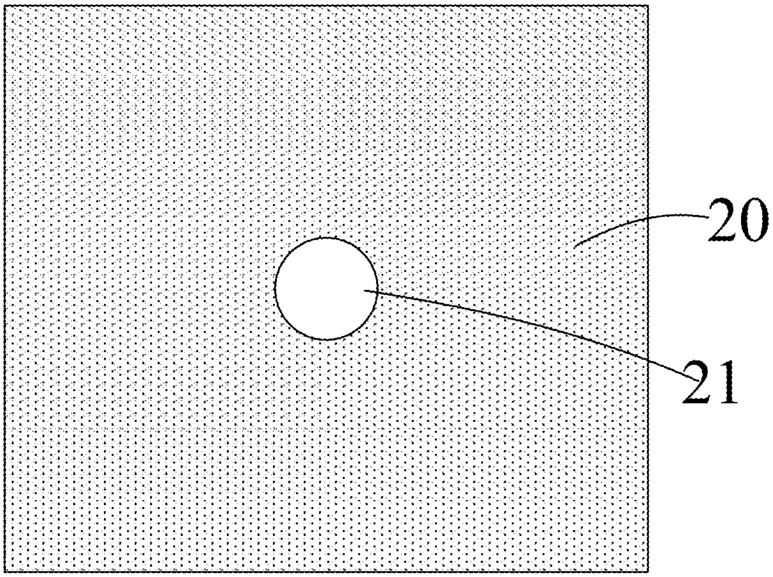
FIG. 4 is a top view of a reference electrode of the dual-band antenna shown in FIG. 3.

In some examples, FIG. 3 is a top view of another dual-band antenna according to an embodiment of the present disclosure. FIG. 4 is a top view of a reference electrode 20 of the dual-band antenna shown in FIG. 3. As shown in FIGS. 3 and 4, the reference electrode 20 is provided with a third groove 21, and the third groove 21 penetrates through the reference electrode 20, an orthographic projection of the third groove 21 on the dielectric substrate 10 is overlapped, at least partially, with an orthographic projection of the radiating element 30 on the dielectric substrate 10. For example, a center of the orthographic projection of the third groove 21 on the dielectric substrate 10 coincides with a center of the orthographic projection of the radiating element 30 on the dielectric substrate 10. The third groove 21 may be circular, and the center of the orthographic projection of the third groove 21 on the dielectric substrate 10 is an orthographic projection of a center of the third groove 21 on the dielectric substrate 10. Of course, the third groove 21 may be of other shapes such as a square. In the embodiment of the present disclosure, by providing the third groove 21 on the reference electrode 20, an overall frequency can be shifted to a low frequency, which is beneficial to a miniaturization design of antennas and broadens a low frequency bandwidth.

In some examples, the third groove 21 on the reference electrode 20 may be not only the through groove as described above, but also an annular groove. For example, the annular groove on the reference electrode 20 is square. Further, a center of a profile of the third groove 21 on the dielectric substrate 10 coincides with a center of a profile of the orthographic projection of the radiating element 30 on the dielectric substrate 10. When the third groove 21 on the reference electrode 20 is an annular groove, a same effect of the through groove can be achieved.

Figure 5:
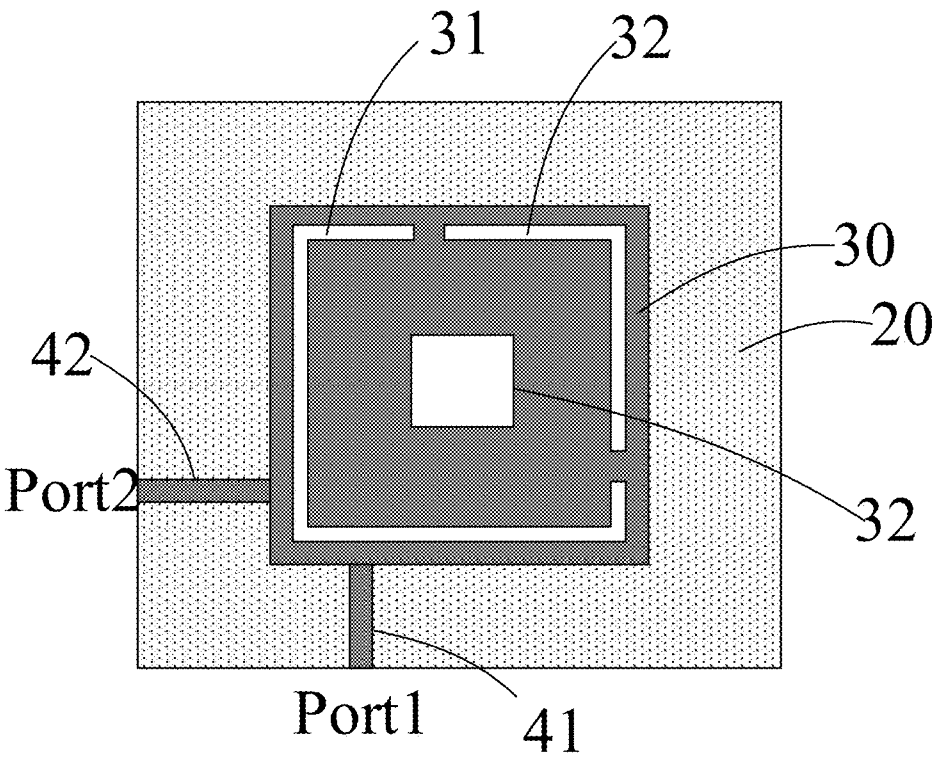
FIG. 5 is a top view of yet another dual-band antenna according to an embodiment of the present disclosure.

In some examples, FIG. 5 is a top view of another yet dual-band antenna according to an embodiment of the present disclosure. As shown in FIG. 5, in the antenna according to the embodiment of the present disclosure, not only the third groove 21 may be provided on the reference electrode 20, but also a fourth groove 33 may be provided in the radiating element 30. A center of an orthographic projection of the fourth groove 33 on the dielectric substrate 10 coincides with the center of the profile of the orthographic projection of the radiating element 30 on the dielectric substrate 10. By providing the fourth groove 33 in the radiating element 30, the overall frequency can be shifted to a lower frequency, which is beneficial to the miniaturization design of the antenna and further broadening the low frequency bandwidth.

Figure 6:
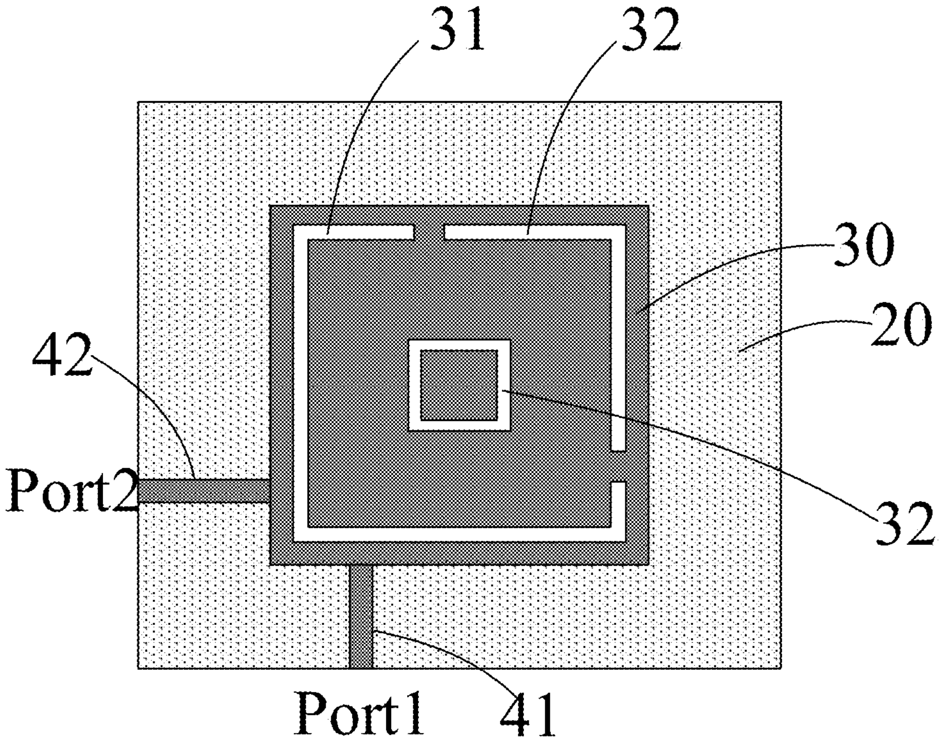
FIG. 6 is a top view of yet another dual-band antenna according to an embodiment of the present disclosure.

In some examples, FIG. 6 is a top view of another yet dual-band antenna according to an embodiment of the present disclosure. As shown in FIG. 6, the fourth groove 33 provided in the radiating element 30 may be not only the through groove as described above, but also an annular groove. For example, the annular groove of the radiating element 30 is square. A center of an orthographic projection of the annular groove on the dielectric substrate 10 coincides with the center of the profile of the orthographic projection of the radiating element 30 on the dielectric substrate 10. The effect of the through groove as described above can also be achieved by opening an annular groove in the radiating element 30.

In some examples, the antenna according to the embodiment of the present disclosure includes not only the above-mentioned structure, but also a feeding structure configured to feed the first feed branch 41 and the second feed branch 42.

Figure 7:
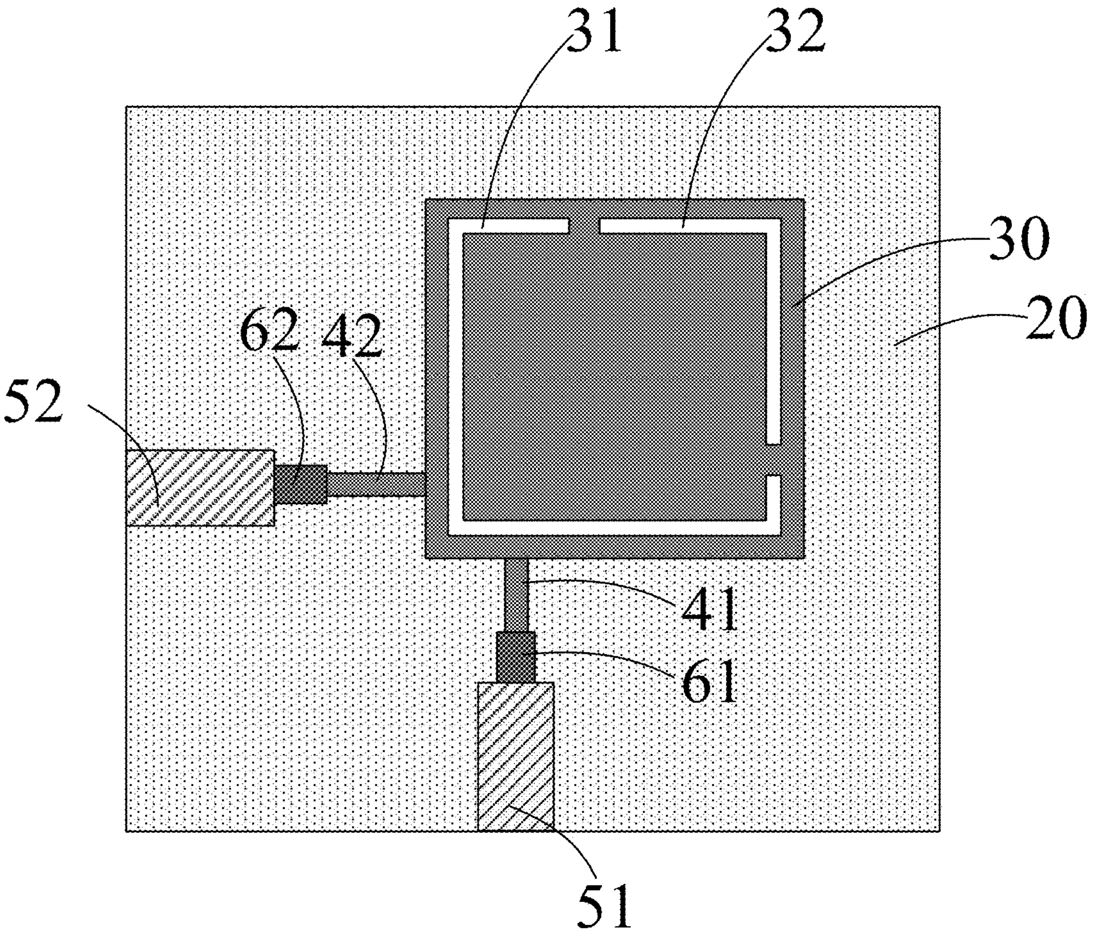
FIG. 7 is a top view of yet another dual-band antenna according to an embodiment of the present disclosure.

For example, FIG. 7 is a top view of yet another dual-band antenna according to an embodiment of the present disclosure. As shown in FIG. 7, the feeding structure includes a first microstrip line 51 a second microstrip line 52, a first impedance transformation assembly 61 and a second impedance transformation assembly 62. The first microstrip line 51 is electrically connected with the first feed branch 41 through the first impedance transformation assembly 61. The second microstrip line 52 is electrically connected with the second feed branch 42 through the second impedance transformation assembly 62. Further, the feeding structure further includes a first connector and a second connector. The first connector is electrically connected with the first microstrip line 51 and the second connector is connected with the second microstrip line 52. Each of the first connector and the second connector includes an SMA connector. Both of the first microstrip line 51 and the second microstrip line 52 are 50Ω microstrip lines, and both of the first impedance transformation assembly 61 and the second impedance transformation assembly 62 are ¼ impedance transformation segments (70.7Ω). The first feed branch 41 and the second feed branch 42 have an impedance of 100Ω. This feeding structure enables the first feed branch 41 and the second feed branch 42 to feed separately.

Figure 8:
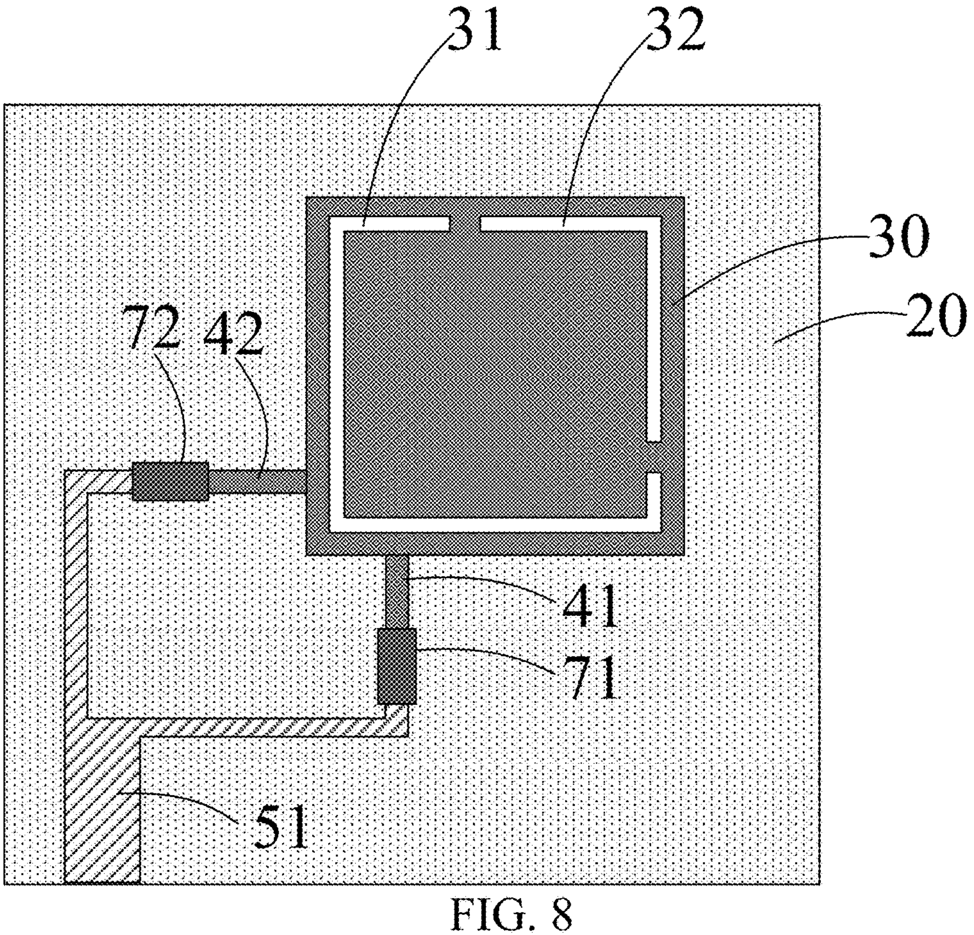
FIG. 8 is a top view of yet another dual-band antenna according to an embodiment of the present disclosure.

For another example, FIG. 8 is a top view of yet another dual-band antenna according to an embodiment of the present disclosure. As shown in FIG. 8, the feeding structure includes a first microstrip line 51 and a switching unit. The microstrip line 51 is electrically connected with the first feed branch 41 and the second feed branch 42 through the switching unit, and the switching unit is configured to perform time division gating a connection of the first microstrip line 51 with the first feed branch 41 through the switching unit and a connection of the first microstrip line 51 with the second feed branch 42. Further, the switching unit may include a first switching module 71 and a second switching module 72. The first microstrip line 51 is connected with the first feed branch 41 through the first switching module 71, and the first microstrip line 51 is connected with the second feed branch 42 through the second switching module 72. At that time, a switching state of the first switching module 71 is controlled to control conduction of the first microstrip line 51 to the first feed branch 41, and a switching state of the second switching module 72 is controlled to control conduction of the first microstrip line 51 to the second feed branch 42. In some examples, the first switching module 71 and the second switching module 72 are both single pole single throw switches, such as PIN diodes, Micro-Electro-Mechanical System (MEMS for short) switching devices and the like. In some examples, the switching unit may also be a single pole double throw switch. Further, the feeding structure includes not only the above-mentioned structure, but also a first connector connected with the first microstrip line 51, and the first connector may be an SMA connector. The first microstrip line 51 is a 50Ω microstrip line. The first feed branch 41 and the second feed branch 42 are 100Ω.

In order to better understand the dual-band antennas according to the embodiments of the present disclosure, the following will be described in connection with specific examples and simulation results of the antennas in the specific examples.

In a first example, as shown in FIGS. 1 and 2, the dual-band antenna includes a dielectric substrate 10, a reference electrode 20, a radiating element 30, and a first feed branch 41 and a second feed branch 42. The dielectric substrate 10 includes a first surface and a second surface disposed opposite each other in a thickness direction of the dielectric substrate 10. The reference electrode 20 is disposed on the first surface, the radiating element 30, the first feed branch 41 (vertical feed branch), and the second feed branch 42 (horizontal feed branch) are disposed on the second surface of the dielectric substrate 10, and all of the radiating element 30, the first feed branch 41, and the second feed branch 42 overlap at least partially with the orthographic projection of the reference electrode 20 on the first surface. The first feed branch 41 is connected with the radiating element 30, and a connection node is a first feed point. The second feed branch 42 is connected with the radiating element 30, and a connection node is a second feed point. The radiating element 30 has a first groove 31 and a second groove 32, and the first groove 31 and the second groove 32 penetrate through the radiating element 30. The first groove 31 has a first length and the second groove 32 has a second length; The first length and the second length are not equal. Length values of the first length and the second length, as well as positions of the first feed point and the second feed point lead to different frequencies of microwave signals radiated by the first feed branch 41 and the second feed branch 42 through the radiating element 30.

In a following simulation experiment, each of the reference electrode 20 and the radiating element 30 is made of metal Cu and has a thickness of 17 μm; The dielectric substrate 10 is made of Rogers 5880 with a dielectric constant of 2.2, a loss tangent of 0.0009 and a thickness of 0.254 mm. The dielectric substrate 10 is a PCB board having dimensions of 6 mm×6 mm, profile dimensions of the radiating element 30 are 3.1 mm×3.1 mm, the first feed branch 41 and the second feed branch (horizontal feed branch) are 0.9 mm from a center of a profile of the radiating element 30, have a line width of 0.2 mm, a characteristic impedance of 100Ω, the first groove 31 has a length of 6.4 mm, and the second groove 32 has a length of 3.5 mm Adjusting the dimensions of the radiating element 30, the lengths of the first groove 31 and the second groove 32, and the position of the first feed branch 41 or the position of the second feed branch 42 affects a dual-band performance (operating frequency band, center frequency, bandwidth) of the antenna.

In practical products, the materials of the reference electrode 20 and the radiating element 30 are not limited to metal Cu, and other metals and alloys such as Al, Mo/Al/Mo, MTD/Cu/MTD and the like can be used. The dielectric substrate 10 is not limited to a PCB board, and rigid and flexible substrates such as glass, PET, and PI and the like can be used, also.

Figure 9:
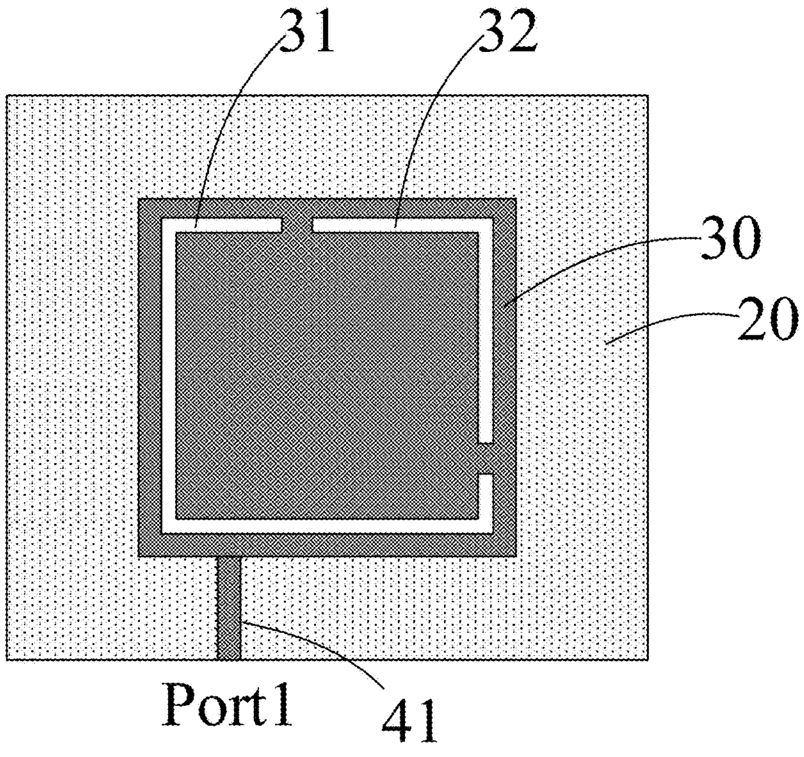
FIG. 9 is a top view of a conventional dual-band antenna with a single feed point.
Figure 10:
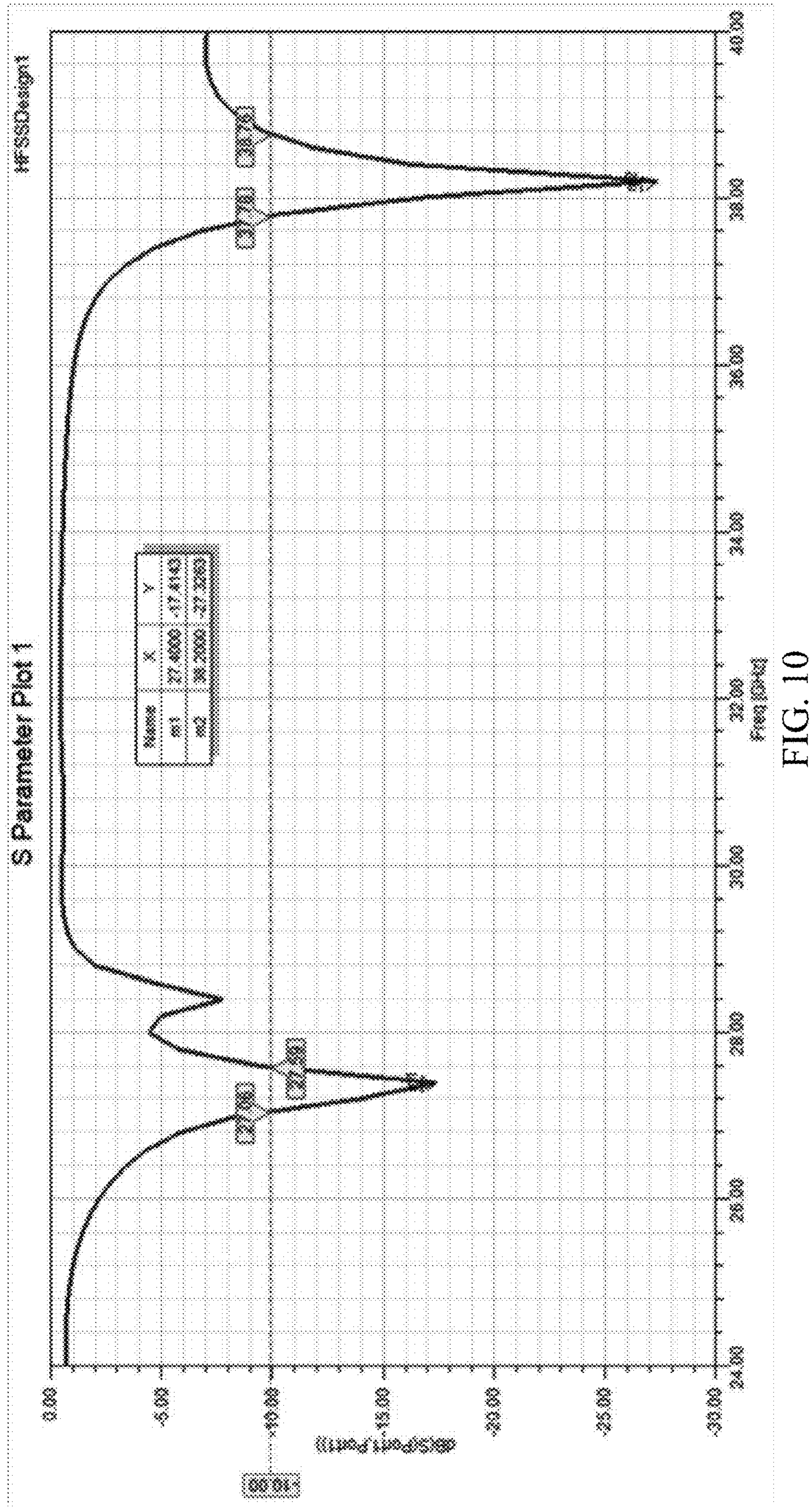
FIG. 10 is a simulation plot of S parameters of the dual-band antenna shown in FIG. 9.

FIG. 9 is a top view of a conventional dual-band antenna with a single feed point. As shown in FIG. 9, it can be seen that the radiating element 30 has only a single first feed branch 41 (vertical feed branch) corresponding to the feed port, Port1. FIG. 10 is a simulation plot of S parameters of the dual-band antenna shown in FIG. 9. From FIG. 10, it can be seen that the operating frequency bands (S11<−10 dB) at the feed port, Port1, are 27.06-27.59 GHz and 37.78-38.76 GHz, corresponding center frequencies are 27.4 GHz and 38.2 GHz, and operating bandwidths are 0.53 GHz and 0.98 GHz.

Figure 11:
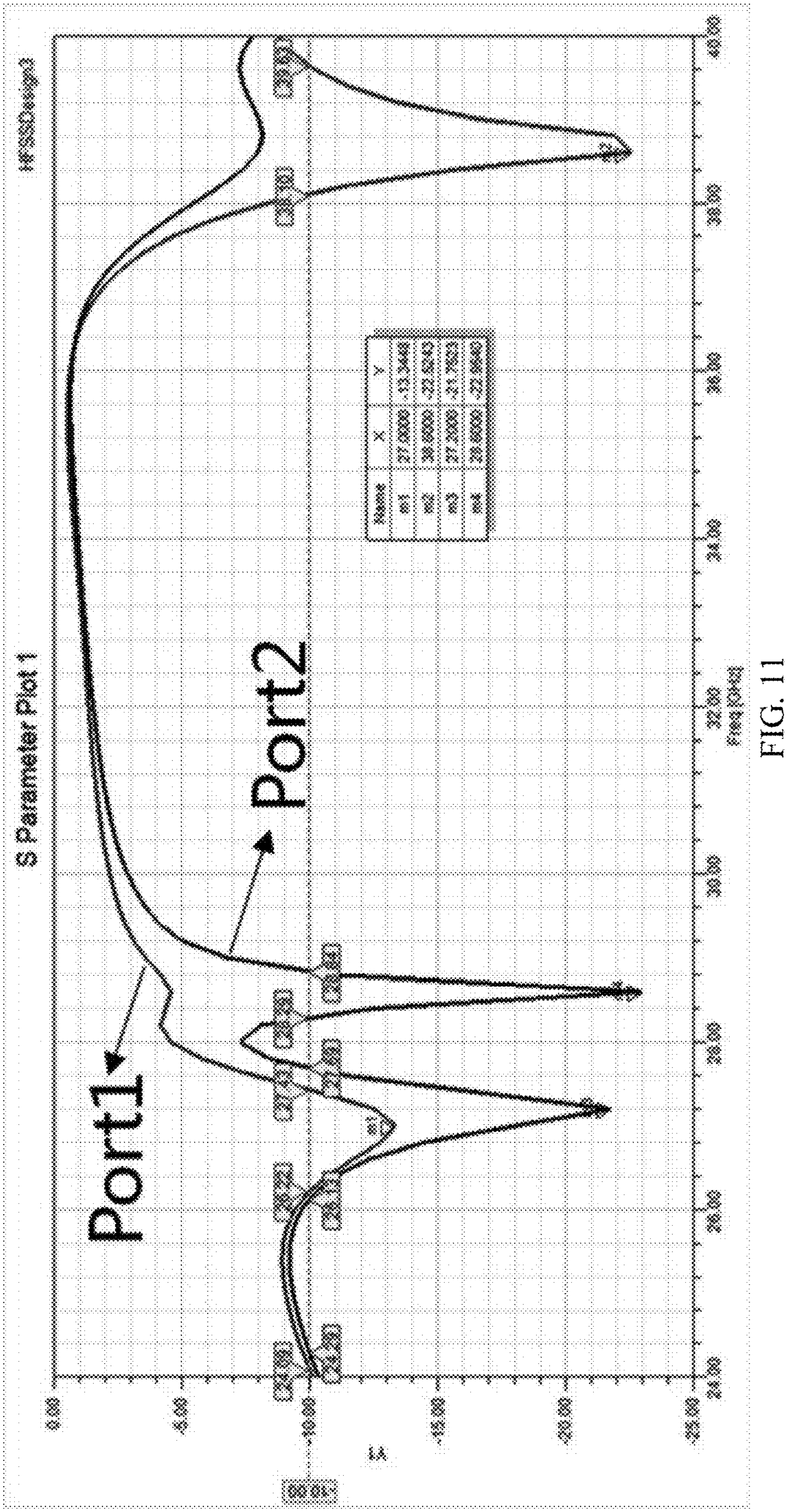
FIG. 11 is a simulation plot of S parameters when Port1 and Port2 of the dual-band antenna shown in FIG. 2 are excited, respectively.

For the dual-band antenna shown in FIG. 2, the feed ports, Port1 and Port2, are excited respectively. FIG. 11 is a simulation plot of S parameters for exciting Port1 and Port2 shown in FIG. 2, respectively. As shown in FIG. 11, the two operating bandwidths at Port1 are broadened to 1.21 GHz and 1.53 GHz, and the corresponding operating frequency bands (S11<−10 dB) are 26.22-27.43 GHz with a center frequency of 27 GHz and 38.10-39.63 GHz with a center frequency of 38.6 GHz, respectively. At that time, dual-band characteristics resulting from exciting Port2 are different from dual-band characteristics resulting from exciting Port1. The operating frequency bands (S11<−10 dB) of Port2 are 26.13-27.69 GHz with a center frequency of 27.2 GHz and 28.29-28.84 GHz with a center frequencies of 28.6 GHz, and the operating bandwidth are 1.56 GHz and 0.55 GHz.

Figure 12:
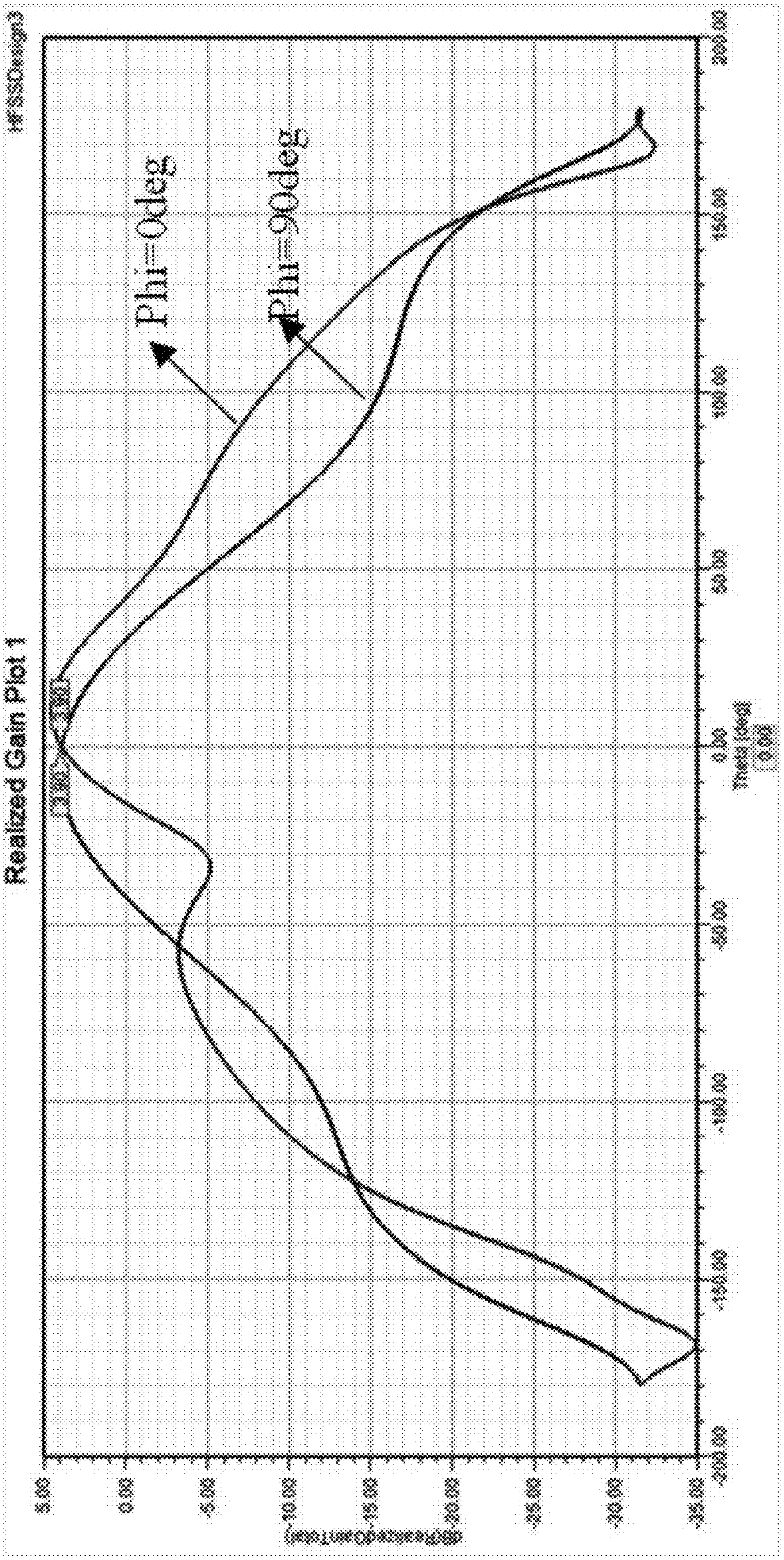
FIG. 12 is a simulation plot at a center frequency of 27 GHz when the Port1 of the dual-band antenna shown in FIG. 2 is excited.
Figure 13:
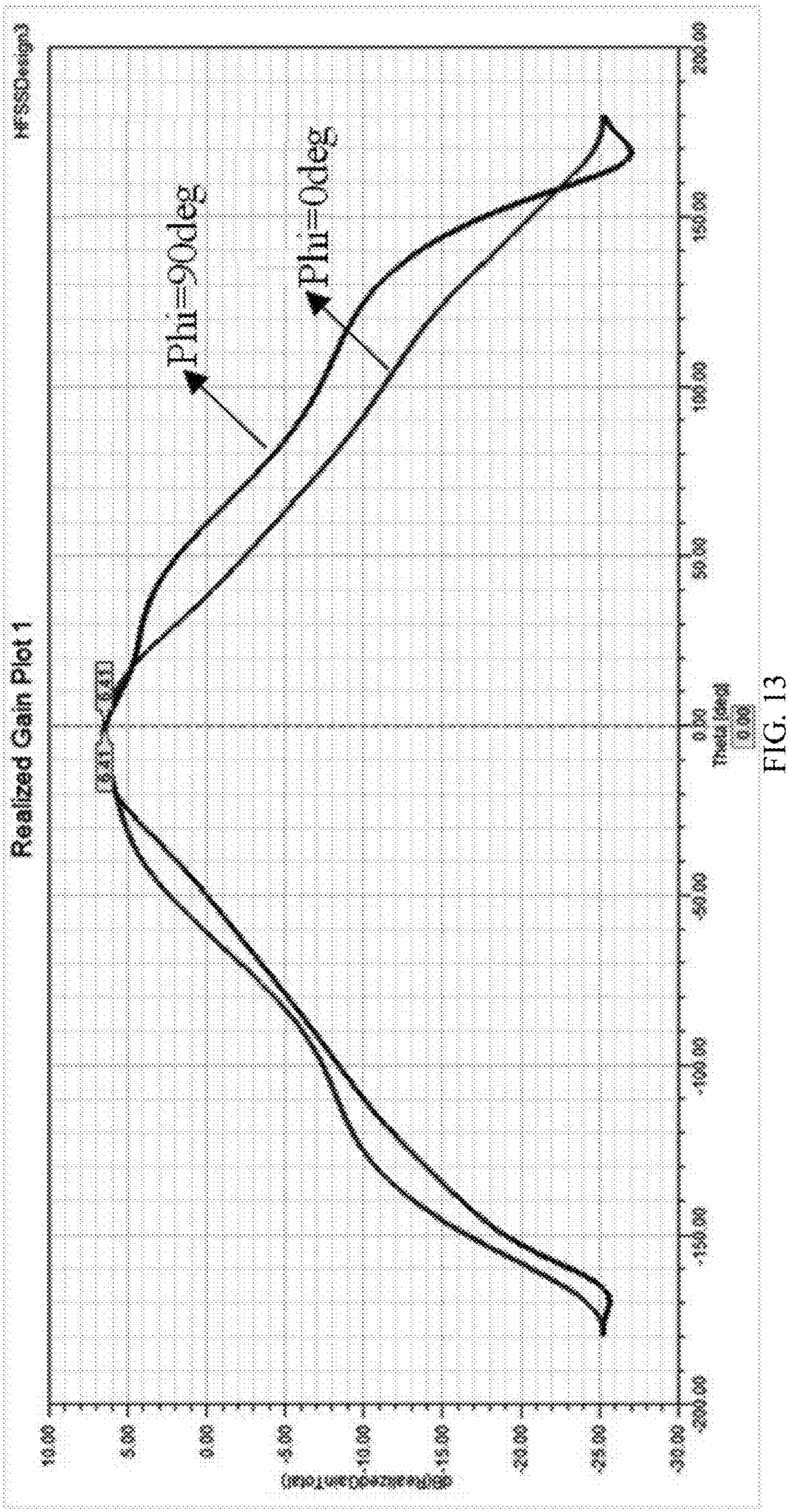
FIG. 13 is a simulation plot at a center frequency of 38.6 GHz when the Port1 of the dual-band antenna shown in FIG. 2 is excited.
Figure 14:
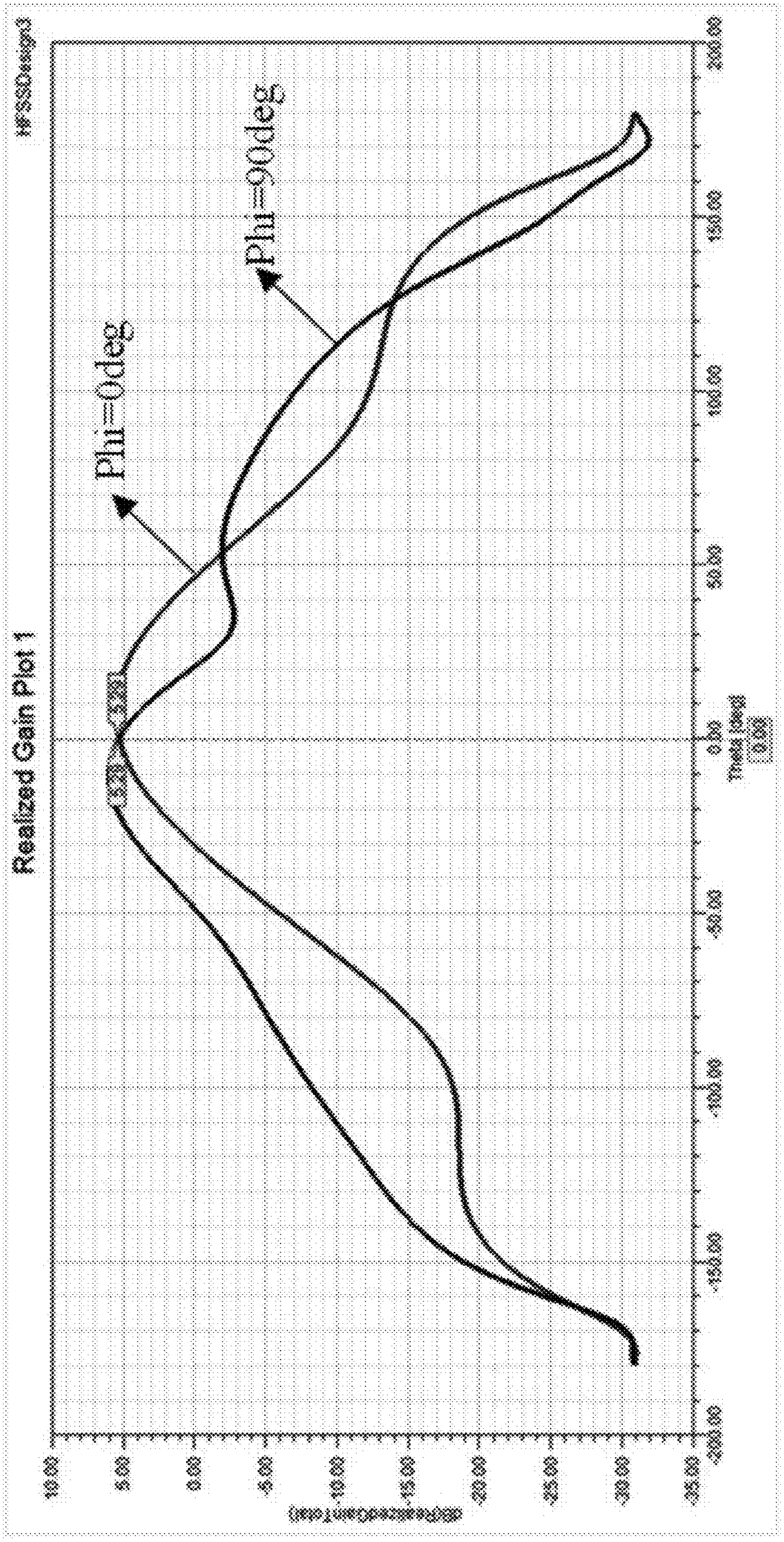
FIG. 14 is a simulation plot at a center frequency of 27 GHz when the Port2 of the dual-band antenna shown in FIG. 2 is excited.
Figure 15:
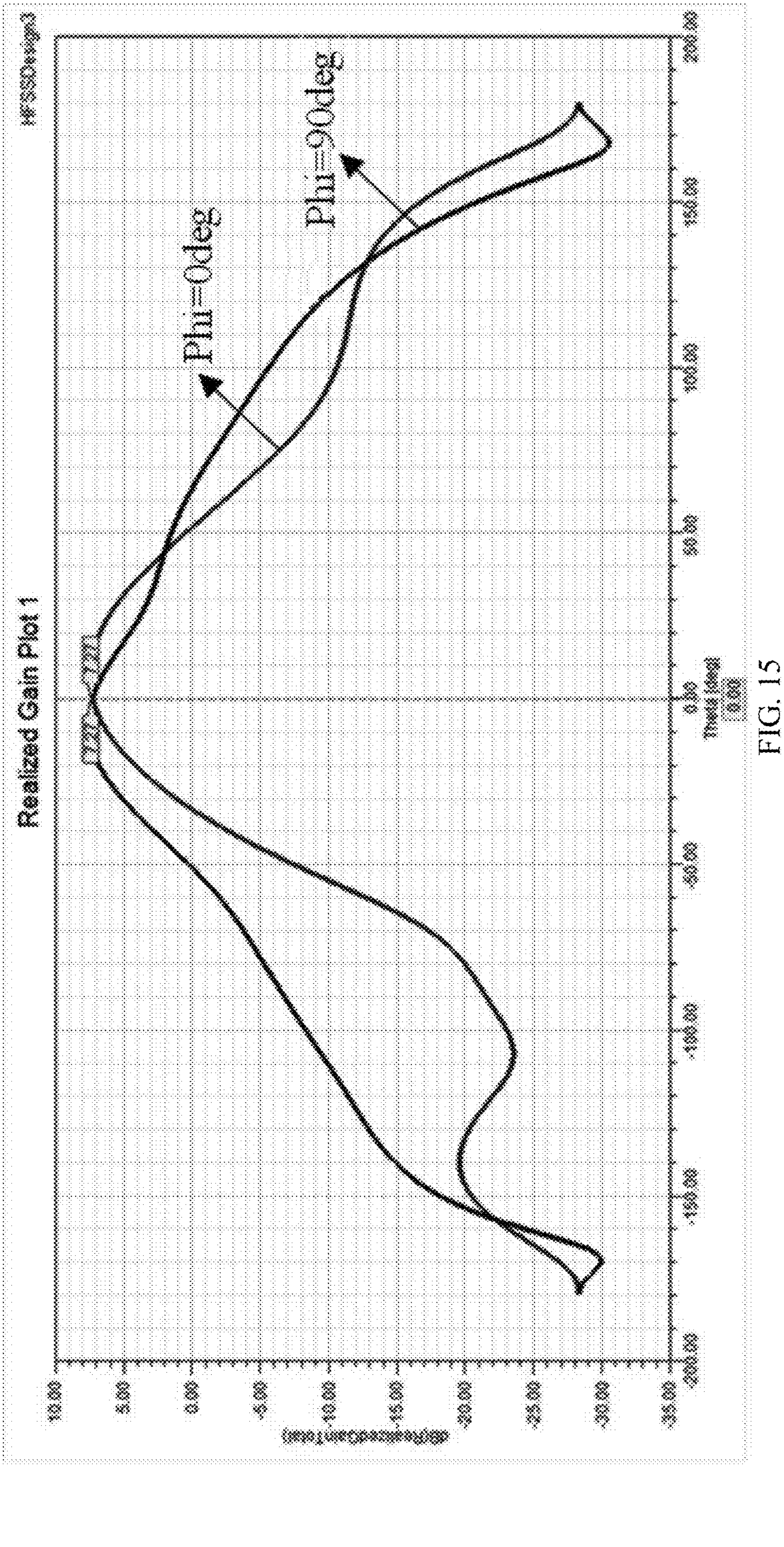
FIG. 15 is a simulation plot at a center frequency of 38.6 GHz when the Port2 of the dual-band antenna shown in FIG. 2 is excited.

FIG. 12 is a simulation pattern at a center frequency of 27 GHz when Port of the dual-band antenna shown in FIG. 2 is excited. FIG. 13 is a simulation pattern at a center frequency of 38.6 GHz when the Port1 of the dual-band antenna shown in FIG. 2 is excited. FIG. 14 is a simulation pattern at a center frequency of 27 GHz when Port2 of the dual-band antenna shown in FIG. 2 is excited; FIG. 15 is a simulation pattern at a center frequency of 28.6 GHz when Port2 of the dual-band antenna shown in FIG. 2 is excited. As shown in FIGS. 12-15, a gain at the center frequency of 27 GHz is 3.9 dB and a gain at the center frequency of 38.6 GHz is 6.41 dB when Port1 is excited. When Port2 is excited, a gain at the center frequency of 27.2 GHz is 5.29 dB and a gain at the center frequency of 28.6 GHz is 7.27 dB.

In a second example, as shown in FIG. 3, the antenna in this example differs from the first example only in that a third groove 21 is provided in the reference electrode 20 and the third groove 21 is a circular through groove. Compared with the first example, the antenna has similar dual-band antenna characteristics. When the third groove 21 is provided in the reference electrode 20, the overall frequency of the antenna shifts to the low frequency, which is beneficial to the miniaturization design of the antenna and broadens the low frequency bandwidth, especially for Port2.

Figure 16:
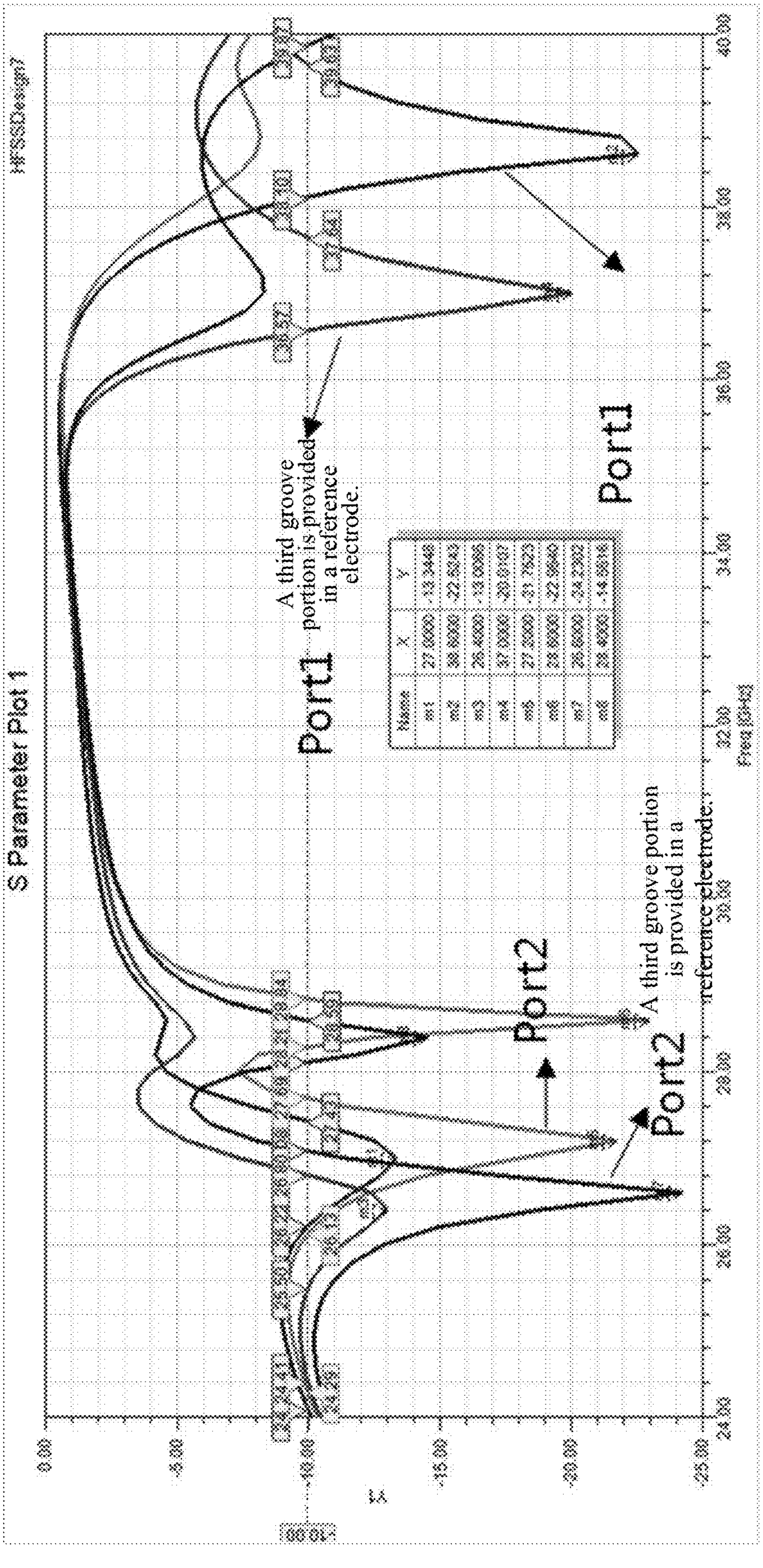
FIG. 16 is a comparison diagram of S-parameter simulation curves when Port1 and Port2 of the dual-band antennas shown in FIGS. 2 and 3 are excited, respectively.

In the following simulation experiment, the third groove 21 is provided in the reference electrode 20, and the third groove 21 is a circular through groove with a radius R. When R is 0.5 mm, FIG. 16 is a comparison diagram of S parameter simulation curves for exciting Port1 and Port2 of the dual-band antennas shown in FIGS. 2 and 3, respectively. As shown in FIG. 16, Port1 operates in the frequency bands (S11<−10 dB) of 25.50-26.80 GHz with a center frequency of 26.4 GHz and an operating bandwidth of 1.3 GHz, and operates in the frequency bands (S11<−10 dB) of 36.57-37.64 GHz with a center frequency of 37 GHz and an operating bandwidth of 1.07 GHz. Port2 operates in the frequency bands (S11<−10 dB) of 24-27.08 GHz with a center frequency of 26.6 GHz and an operating bandwidth of 3.08 GHz, and operates in the frequency bands (S11<−10 dB) of 28.11-28.59 GHz with a center frequency of 28.4 GHz and an operating bandwidth of 0.48 GHz.

In a third example, as shown in FIG. 4, the antenna in this example differs from the antenna in the first example only in that the fourth groove 33 is provided in the intermediate region of the radiating element 30 and the fourth groove 33 is a square through groove. This antenna can achieve an effect similar to that of the second example. After the fourth groove 33 is provided in the intermediate region of the radiating element 30, the overall frequency shifts to the low frequency, which is beneficial to the miniaturization design, and the low frequency bandwidth is broadened, especially for Port2.

Figure 17:
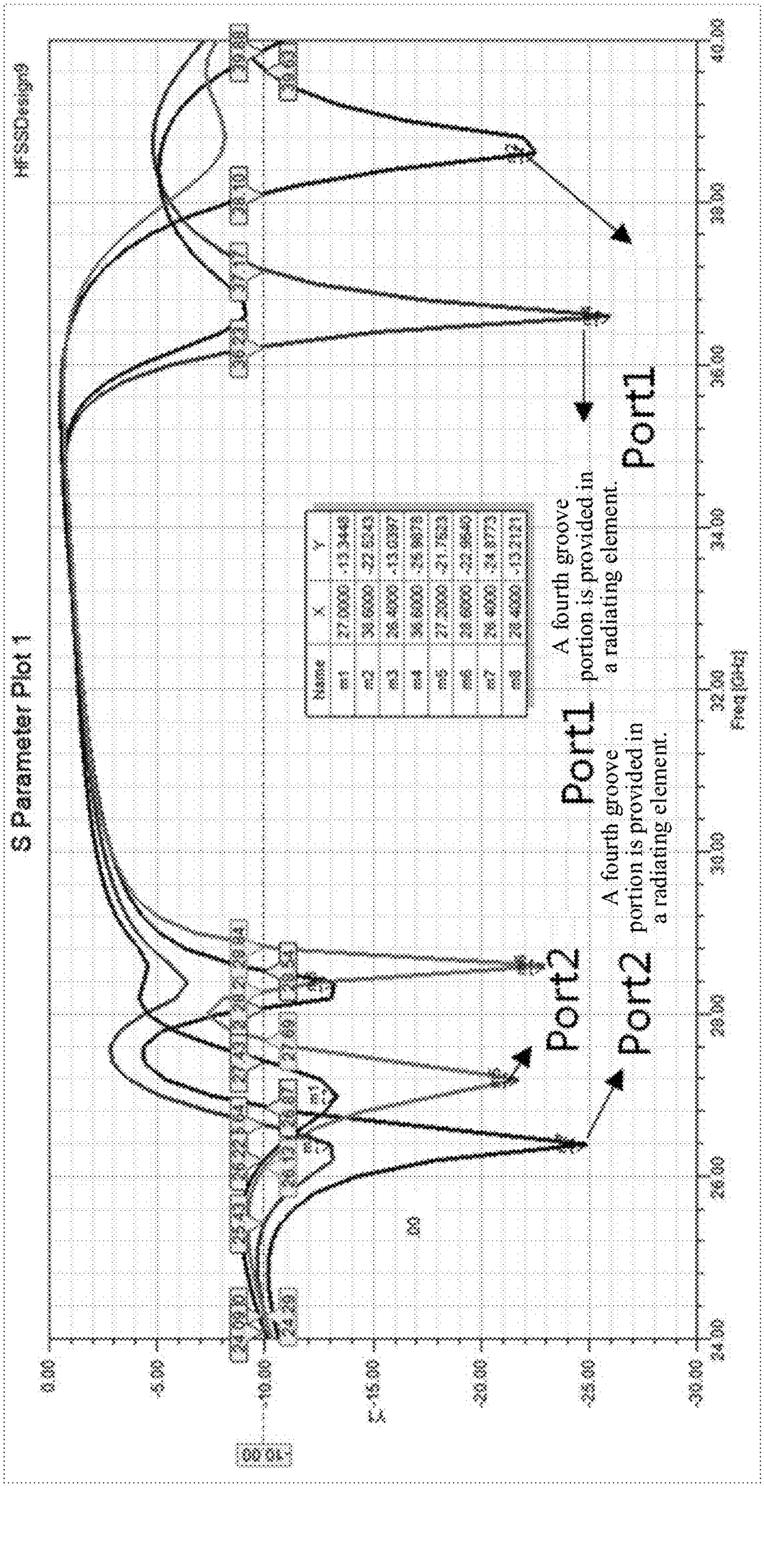
FIG. 17 is a comparison diagram of S-parameter simulation curves when Port1 and Port2 of the dual-band antennas shown in FIGS. 2 and 4 are excited, respectively.

In the following simulation experiment, a side length of the fourth groove 33 provided in the intermediate region of the radiating element 30 is Ls, and Ls is 0.9 mm. FIG. 17 is a comparison diagram of S parameter simulation curves for exciting Port1 and Port2 of the dual-band antennas shown in FIGS. 2 and 4, respectively. As shown in FIG. 17, Port1 operates in the frequency bands (S11<−10 dB) of 25.43-26.64 GHz with a center frequency of 26.4 GHz and an operating bandwidth of 1.21 GHz, and operates in the frequency bands (S11<−10 dB) of 36.23-37.17 GHz with a center frequency of 36.6 GHz and an operating bandwidth of 0.94 GHz. Port2 operates in the frequency bands (S11<−10 dB) of 24-26.87 GHz with a center frequency of 26.4 GHz and an operating bandwidth of 2.87 GHz, and operates in the frequency bands (S11<−10 dB) of 28.08-28.54 GHz with a center frequency of 28.4 GHz and an operating bandwidth of 0.46 GHz.

Figure 18:
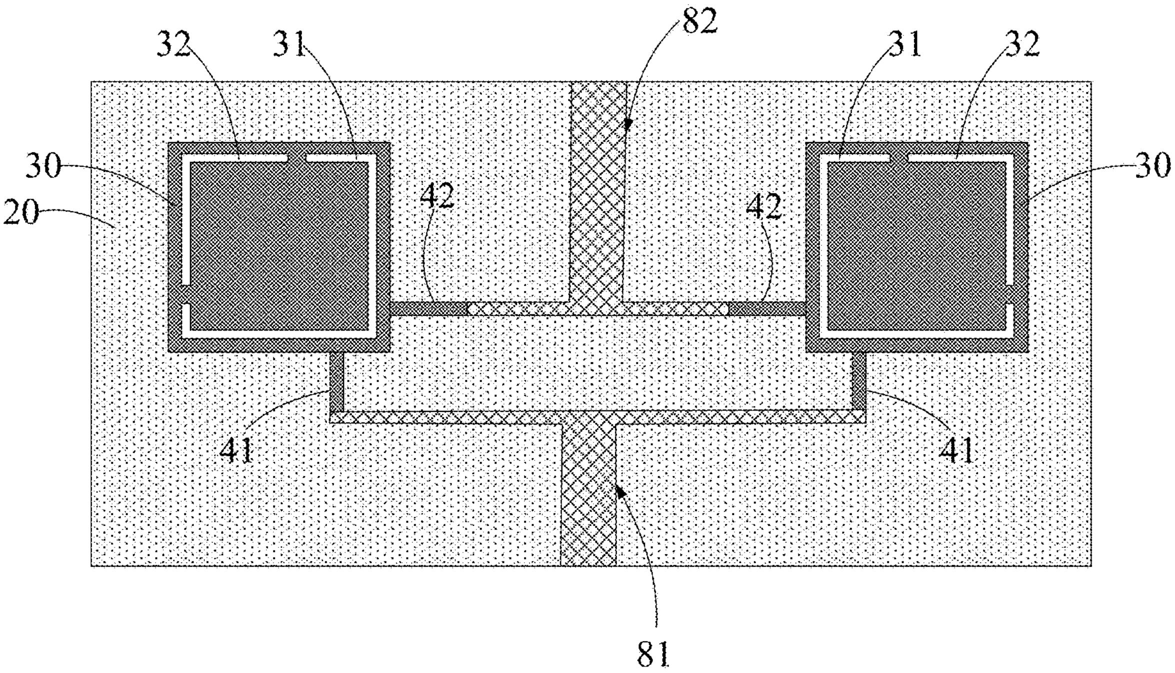
FIG. 18 is a top view of an antenna array according to an embodiment of the present disclosure.

In a second aspect, FIG. 18 is a top view of an antenna array according to an embodiment of the present disclosure. As shown in FIG. 18, an antenna array is also provided in an embodiment of the present disclosure. The antenna array may include any of the dual-band antennas in FIGS. 2-3, 5-6 described above or the like. The antenna array further includes a first feed network 81 and a second feed network 82. The first feed network 81 is configured to feed the first feed branch 41 of each dual-band antenna. The second feed network 82 is configured to feed the second feed branch 42 of each dual-band antenna.

It should be noted that the reference electrode 20 of each dual-band antenna in the antenna array may have an integral structure, and both of the first feed network 81 and the second feed network 82 overlap with the orthographic projection of the reference electrode 20 on the dielectric substrate 10.

In some examples, the antenna array may be a 1×2 doubly fed point adjustable dual-band antenna array. That is, the antenna array includes two dual-band antennas disposed side by side. Each of the first feed network 81 and the second feed network 82 employs a one point two power splitter. At that time, the two feed branches of the first feed network 81 are electrically connected with the two first feed branches 41 of the dual-band antenna, respectively, and the two feed branches of the second feed network 82 are electrically connected to the two second feed branches 42 of the dual-band antenna, respectively.

In a third aspect, an antenna array is also provided in an embodiment of the present disclosure. The antenna array may include a plurality of dual-band antennas which may be the dual-band antennas in FIG. 7 or FIG. 8.

Figure 19:
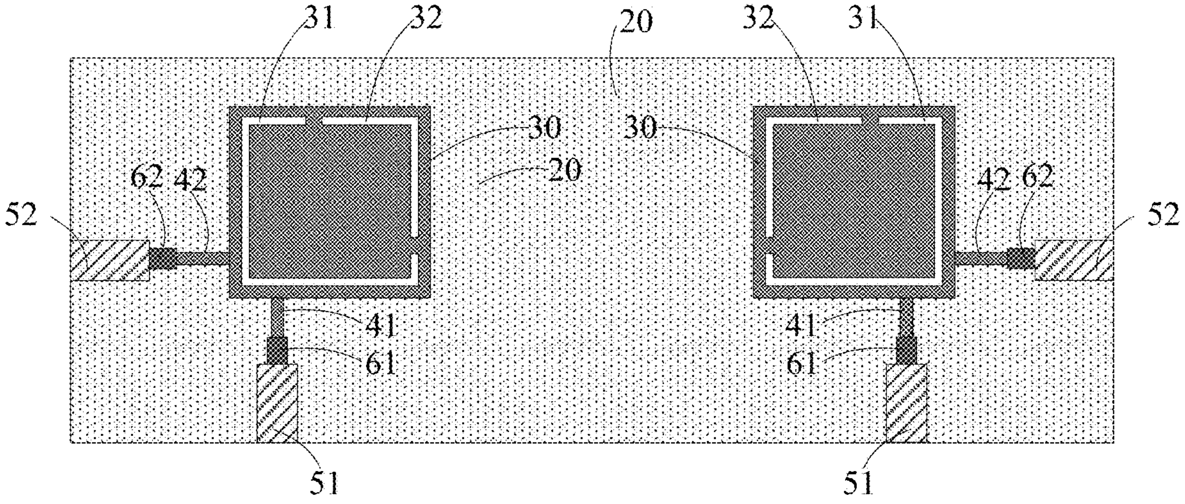
FIG. 19 is a top view of an antenna array according to an embodiment of the present disclosure.
Figure 20:
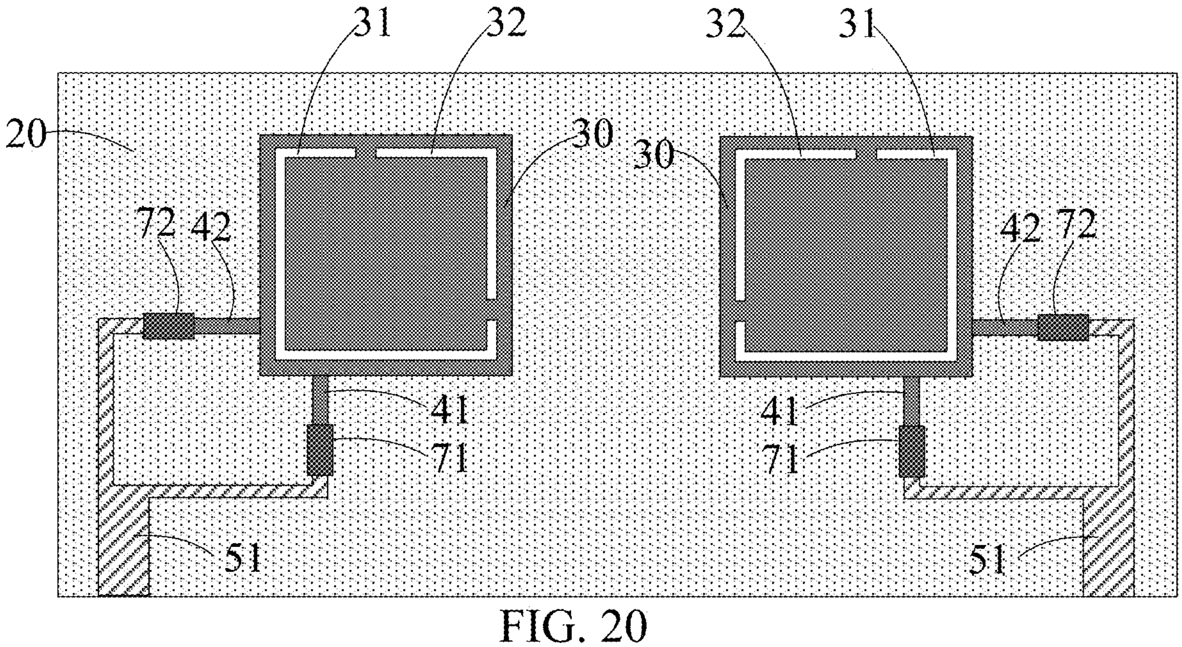
FIG. 20 is a top view of an antenna array according to an embodiment of the present disclosure.

In some examples, the antenna array may be a 1×2 MIMO doubly fed point adjustable dual-band antenna array. As shown in FIG. 19, the antenna array includes dual-band antennas as shown in FIG. 7 disposed side by side. As shown in FIG. 20, the antenna array includes dual-band antennas as shown in FIG. 8 disposed side by side.

In a fourth aspect, an electronic device is provided in an embodiment of the present disclosure. The electronic device includes any of the dual-band antennas or any of the antenna array described above.

The electronic device in the embodiment of the present disclosure further includes a transceiver unit, a radio frequency transceiver, a signal amplifier, a power amplifier and a filtering unit. The antenna in the communication system can be used as a transmitting antenna or a receiving antenna. The transceiver unit may include a baseband and a receiving end, wherein the baseband provides signals in at least one frequency band, such as providing 2G signals, 3G signals, 4G signals, 5G signals, etc., and transmits the signals in at least one frequency band to the radio frequency transceiver. After the signal is received by the antenna in the antenna system, it can be processed by the filter unit, power amplifier, signal amplifier, RF transceiver and then transmitted to the receiving end in the transceiver unit, the receiving end can be, for example, a smart gateway, etc.

Further, the RF transceiver is connected with the transceiver unit for modulating the signal transmitted by the transceiver unit or for demodulating the signal received by the antenna and transmitting it to the transceiver unit. Specifically, the radio frequency transceiver may include a transmitting circuit, a receiving circuit, a modulation circuit, and a demodulation circuit. After the transmitting circuit receives a plurality of types of signals provided by the substrate, the modulation circuit may modulate a plurality of types of signals provided by a baseband and then transmit the signals to the antenna. The antenna receives the signal and transmits it to the receiving circuit of the radio frequency transceiver. The receiving circuit transmits the signal to the demodulation circuit, which demodulates the signal and transmits it to the receiving end.

Further, the radio frequency transceiver is connected with a signal amplifier and a power amplifier, and the signal amplifier and the power amplifier are in turn connected with a filter unit, which is connected with at least one antenna. In the process of transmitting signals from the antenna system, the signal amplifier is used for improving the signal-to-noise ratio of the signal output by the radio frequency transceiver and then transmitting the signal to the filter unit; the power amplifier is used for amplifying the power of the signal output by the radio frequency transceiver and transmitting it to the filter unit; the filter unit can specifically include a diplexer and a filter circuit. The filter unit combines and filters out noise from the signals output by the signal amplifier and power amplifier, and then transmits them to the antenna, and the antenna radiates the signals. In the process of receiving signals by the antenna system, the antenna receives the signals and transmits them to the filter unit, the filter unit filters out noise from the signals received by the antenna and transmits them to the signal amplifier and power amplifier, and the signal amplifier gains the signals received by the antenna to increase the signal-to-noise ratio; the power amplifier amplifies the power of the signal received by the antenna. The signal received by the antenna is transmitted to the radio frequency transceiver after being processed by the power amplifier and the signal amplifier, and then the radio frequency transceiver transmits it to the transceiver unit.

In some examples, the signal amplifier may include various types of signal amplifiers, such as low noise amplifiers, which is not limited herein.

In some examples, the communication system provided in the embodiments of the present disclosure further includes a power management unit, which is connected with the power amplifier to provide the power amplifier with a voltage for amplifying the signal.

It is to be understood that the above embodiments are only exemplary embodiments employed for the purpose of illustrating the principles of the present invention, however the present invention is not limited thereto. To those of ordinary skill in the art, various modifications and improvements may be made without departing from the spirit and substance of the present disclosure, and these modifications and improvements are also considered to be within the scope of the present disclosure.

The invention claimed is:

1. A dual-band antenna comprising:

a dielectric substrate having a first surface and a second surface disposed opposite each other in a thickness direction of the dielectric substrate;

a reference electrode disposed on the first surface; and a radiating element, a first feed branch and a second feed branch, wherein the radiating element, the first feed branch and the second feed branch are all disposed on the second surface, and a connection node of the first feed branch and the radiating element is a first feed point, and a connection node of the second feed branch and the radiating element is a second feed point; and all of the radiating element, the first feed branch and the second feed branch are overlapped, at least partially, with an orthographic projection of the reference electrode on the first surface; wherein the radiating element is provided with a first groove and a second groove, the first groove has a first length, and the second groove has a second length;

the first length and the second length are not equal; and length values of the first length and the second length, as well as positions of the first feed point and the second feed point lead to different frequencies of microwave signals radiated by the first feed branch and the second feed branch through the radiating element.

2. The dual-band antenna of claim 1, wherein the reference electrode is provided with a third groove that is overlapped, at least partially, with the orthographic projection of the radiating element on the dielectric substrate.

3. The dual-band antenna of claim 2, wherein a center of a profile of an orthographic projection of the radiating element on the dielectric substrate is coincident with a center of an orthographic projection of the third groove on the dielectric substrate.

4. The dual-band antenna of claim 1, wherein the radiating element is provided with a fourth groove, and a center of an orthographic projection of the fourth groove on the dielectric substrate coincides with a center of a profile of an orthographic projection of the radiating element on the dielectric substrate.

5. The dual-band antenna of claim 1, wherein the radiating element is provided with a fourth groove, the fourth groove is an annular groove, and a center of an orthographic projection of the annular groove on the dielectric substrate coincides with a center of a profile of an orthographic projection of the radiating element on the dielectric substrate.

6. The dual-band antenna of claim 1, further comprising a feeding structure comprising a first microstrip line, a second microstrip line, a first impedance transformation assembly and a second impedance transformation assembly; wherein the first microstrip line is electrically connected with the first feed branch through the first impedance transformation assembly, and the second microstrip line is electrically connected with the second feed branch through the second impedance transformation assembly.

7. The dual-band antenna of claim 6, wherein the feeding structure further comprises a first connector and a second connector; and the first connector is electrically connected with the first microstrip line, and the second connector is connected with the second microstrip line.

8. The dual-band antenna of claim 1, further comprising a feeding structure comprising a first microstrip line and a switching unit, wherein the feeding structure is electrically connected with the first feed branch and the second feed branch through the switching unit, and the switching unit is configured to perform time division gating a connection of the first microstrip line with the first feed branch through the switching unit and a connection of the first microstrip line with the second feed branch.

9. The dual-band antenna of claim 8, wherein the switching unit comprises a first switching module and a second switching module; and the first microstrip line is connected with the first feed branch through the first switching module, and the first microstrip line is connected with the second feed branch through the second switching module.

10. The dual-band antenna of claim 9, wherein the first switching module and the second switching module comprise a PIN diode or a Micro-Electro-Mechanical System, MEMS, switching device.

11. The dual-band antenna of claim 8, wherein the feeding structure further comprises a first connector connected with the first microstrip line.

12. The dual-band antenna of claim 1, wherein the radiating assembly comprises an intermediate region and a margin region surrounding the intermediate region, and both of the first groove and the second groove are located in the margin region.

13. The dual-band antenna of claim 1, wherein the first groove and the second groove are disposed sequentially surrounding the intermediate region.

14. An antenna array comprising a plurality of dual-band antennas, wherein the dual-band antenna comprises the dual-band antenna of claim 1.

15. An electronic device comprising the dual-band antenna of claim 1.

16. An antenna array comprising a plurality of dual-band antennas, a first feed network and a second feed network; wherein the dual-band antenna comprises:

a dielectric substrate having a first surface and a second surface disposed opposite each other in a thickness direction of the dielectric substrate;

a reference electrode disposed on the first surface;

a radiating element, a first feed branch and a second feed branch, wherein the radiating element, the first feed branch and the second feed branch are all disposed on the second surface, and a connection node of the first feed branch and the radiating element is a first feed point, and a connection node of the second feed branch and the radiating element is a second feed point;

all of the radiating element, the first feed branch and the second feed branch are overlapped, at least partially, with an orthographic projection of the reference electrode on the first surface; wherein the radiating element is provided with a first groove and a second groove, the first groove has a first length, and the second groove has a second length;

the first length and the second length are not equal;

length values of the first length and the second length, as well as positions of the first feed point and the second feed point lead to different frequencies of microwave signals radiated by the first feed branch and the second feed branch through the radiating element;

the first feed network is configured to feed a first feed branch of each of the dual-band antennas; and the second feed network is configured to feed a second feed branch of each of the dual-band antennas.

17. The antenna array of claim 16, wherein the reference electrode is provided with a third groove that is overlapped, at least partially, with the orthographic projection of the radiating element on the dielectric substrate.

18. The antenna array of claim 17, wherein a center of a profile of an orthographic projection of the radiating element on the dielectric substrate is coincident with a center of an orthographic projection of the third groove on the dielectric substrate.

19. The antenna array of claim 16, wherein the radiating element is provided with a fourth groove, and a center of an orthographic projection of the fourth groove on the dielectric substrate coincides with a center of a profile of an orthographic projection of the radiating element on the dielectric substrate.

20. The antenna array of claim 16, wherein the radiating element is provided with a fourth groove, the fourth groove is an annular groove, and a center of an orthographic projection of the annular groove on the dielectric substrate coincides with a center of a profile of an orthographic projection of the radiating element on the dielectric substrate.

* * * * *